(12) United States Patent
Hebb et al.

(10) Patent No.: US 6,711,153 B1
(45) Date of Patent: Mar. 23, 2004

(54) ROUTE LOOKUP ENGINE

(75) Inventors: Andrew T. Hebb, Hudson, MA (US); Sanjay G. Cherian, Brookline, NH (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 09/459,441

(22) Filed: Dec. 13, 1999

(51) Int. Cl.$^7$ .............................................. H04L 12/56
(52) U.S. Cl. ................... 370/351; 370/395.31
(58) Field of Search ................. 370/351, 389, 370/413, 395.31, 395.32

(56) References Cited

U.S. PATENT DOCUMENTS

| | | | |
|---|---|---|---|
| 5,412,654 A | 5/1995 | Perkins .......................... 370/94 |
| 5,509,123 A | * 4/1996 | Dobbins et al. ............. 370/389 |
| 5,787,430 A | 7/1998 | Doeringer et al. |
| 5,842,224 A | 11/1998 | Fenner ........................ 711/202 |
| 5,870,739 A | 2/1999 | Davis, III et al. .............. 707/4 |
| 5,905,725 A | * 5/1999 | Sindhu et al. .............. 370/389 |
| 5,946,679 A | 8/1999 | Ahuja et al. .................... 707/3 |
| 6,011,795 A | 1/2000 | Varghese et al. ............ 370/392 |
| 6,014,659 A | 1/2000 | Wilkinson, III et al. ........ 707/3 |
| 6,052,683 A | 4/2000 | Irwin ............................ 707/8 |
| 6,061,712 A | 5/2000 | Tzeng ........................ 709/202 |
| 6,192,051 B1 | * 2/2001 | Lipman et al. ............. 370/389 |
| 6,266,706 B1 | * 7/2001 | Brodnik et al. ............. 370/351 |
| 6,463,067 B1 | * 10/2002 | Hebb et al. .................. 370/413 |

OTHER PUBLICATIONS

Small Forwarding Tables for Fast Routing Lookups; Mikael Degermark, Andrej Brodnik, Svante Carlsson, and Stephen Pink, Department of Computer Science and Electrical Engineering, Lulea University of Technology, Sweden (1997).
Scalable High Speed IP Routing Lookups; Jon Turner, George Varghese, Marcel Waldvogel, Aug. 21, 1997.
Classless Inter–Domain Routing (CIDR): and Address Assignment and Aggregation Strategy, Sep. 1993.
Faster IP Lookups Using Controlled Prefix Expansion; V. Srinivasan, George Varghese, Department of Computer Science, Washington University, Nov. 7, 1997.

* cited by examiner

Primary Examiner—Salvatore Cangialosi

(57) ABSTRACT

A Route Lookup Engine (RLE) for determining a next hop index is disclosed. The RLE receives a lookup key and performs a multi-bit trie search with prefix expansion and capture of a variable stride trie. The data that the RLE returns comprises the next hop information and status flags. The RLE uses a compact, field reusable data structure. The RLE performs both unicast and multicast IP address lookups on Virtual Private Networks. The RLE uses separate indexing and forwarding memories. The upper bound of the search time for the RLE is fixed regardless of the route table size.

21 Claims, 4 Drawing Sheets

ROUTE LOOKUP ENGINE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Network devices such as routers must perform route lookups as part of their processing operations. A route lookup is necessary for every packet received by a router in order to determine where the packet is to be sent next. The received packets include a 32-bit wide destination address. The destination address identifies a unique address to which the packet is to be forwarded. A route lookup utilizes the destination address of the received packet in order to identify the next-hop address and exit port in a routing table. Given that the destination address is 32 bits wide, the number of possible destinations is greater than one billion. An IP address comprises a network number and a host number. The network number is of variable length and identifies a unique network. Concatenated to the network number is a host number. The host number identifies a unique host system within a particular network. A received network number part of the address is matched with multiple entries in a routing table to identify the best match. The best match is the one with the largest matching number of bits in the first part in the address. Known methods used to perform this matching are complicated and can take a long time. It would be desirable to provide a route lookup engine which can perform a route lookup quickly and efficiently.

BRIEF SUMMARY OF THE INVENTION

A Route Lookup Engine (RLE) for determining a next hop index is disclosed. The RLE receives a lookup key and performs a multi-bit trie search with prefix expansion and capture of a variable stride trie. The data that the RLE returns comprises the next hop information and status flags. The RLE uses a compact, field reusable data structure. The RLE performs both unicast and multicast IP address lookups on Virtual Private Networks. The RLE uses separate indexing and forwarding memories. The upper bound of the search time for the RLE is fixed regardless of the route table size.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
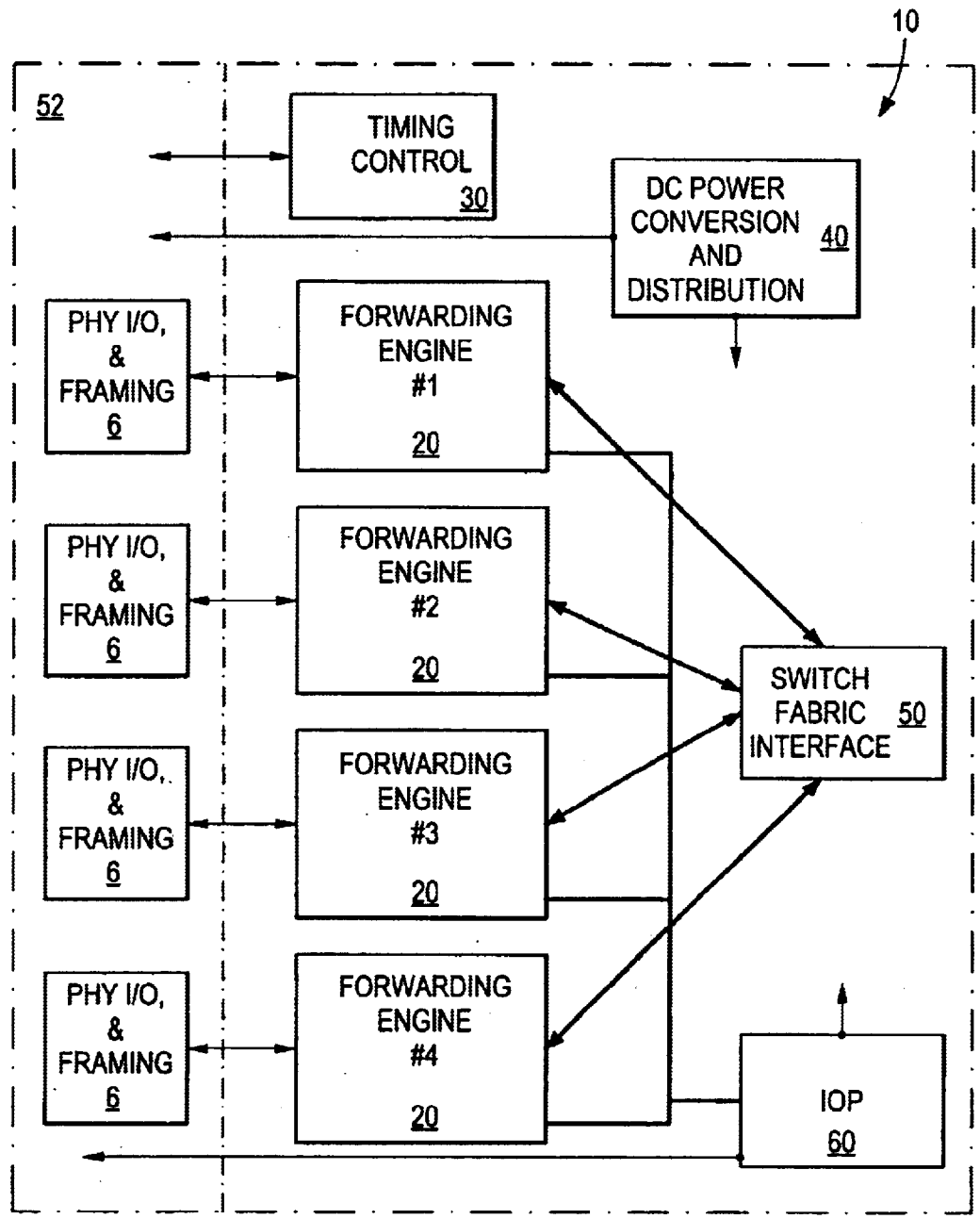
FIG. 1 is a top-level block diagram of an ATM switch.

A Route Lookup Engine (RLE) is disclosed. The RLE may be used in a variety of applications. In a preferred embodiment the RLE is part of an Internet Protocol (IP) routing subsystem for an Asynchronous Transfer Mode (ATM) switch. The routing subsystem of the ATM switch provides a fast and efficient route lookup mechanism. Referring to FIG. 1, a top-level block diagram of a an ATM switch is shown. The ATM switch includes a Input/Output Adapter (IOA) 52. The IOA includes interface optics, Synchronous Optical Network (SONET) framers and High Level Data Link Control (HDLC) controllers. The ATM switch also includes a Input/Output Module (IOM) 10. The IOM includes a plurality of forwarding engines 20. The IOM further includes a timing control unit 30, a DC power conversion and distribution unit 40, a switch fabric interface 50 and control processor 60. The timing control unit 30 of the IOM provides system reference for local timing to the physical layer. The Power Conversion and Distribution unit 40 of the IOM comprises a DC-DC converter. The −48 volts available from the backplane is converted to the required voltages for the module.

The switch fabric interface 50 connects each forwarding engine with other cards in the switch via the switch fabric. Data is carried in the form of ATM cells. Switch fabric congestion information is also carried back from the fabric and reformatted/summarized for the forwarding engine.

The control processor 60 comprises a Pentium microprocessor as a background general-purpose processor. The forwarding engines 20 will be described in detail below.

Figure 2:
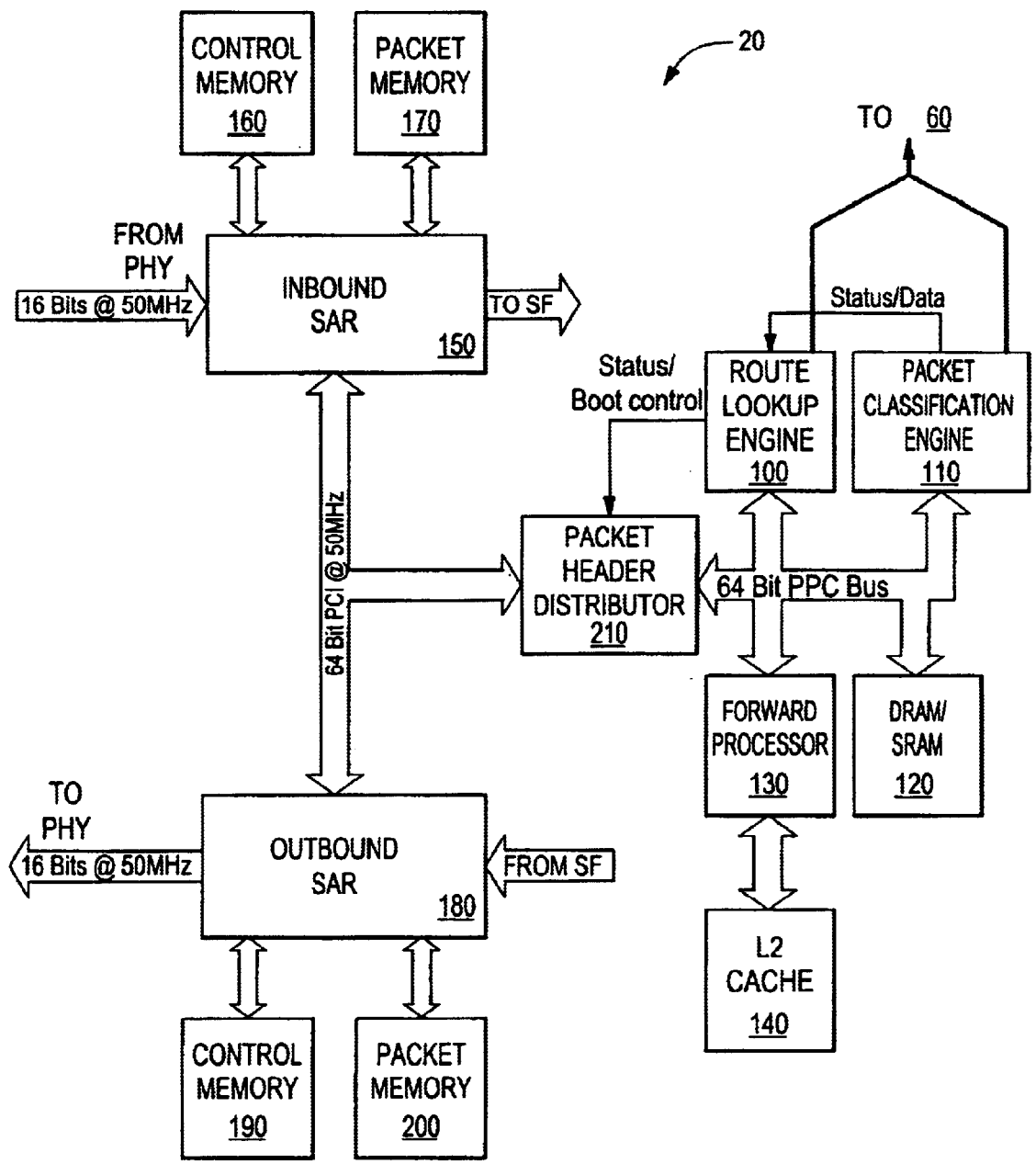
FIG. 2 is a block diagram of a forwarding engine.

Referring now to FIG. 2, a block diagram of a single forwarding engine 20 of the IOM is shown. The forwarding engine 20 comprises an inbound Segmentation and Reassembly (SAR) device 150 with associated control memory 160 and packet memory 170, an outbound SAR 180 with associated control memory 190 and packet memory 200, a Packet Header Distributor (PHD) 210, a Packet Classification Engine (PCE) 110, a Route Lookup Engine (RLE) 100, a forwarding processor 130, a cache 140 associated with the forwarding processor and a DRAM/SRAM 120.

The forwarding engine 20 processes inbound and outbound packets. For inbound packets, a packet is transferred to the inbound SAR 150, where the packet is stored in the packet memory 170. The inbound SAR 150 sends the highest Quality of Service (QoS) packet to the PHD 210. The forwarding processor 130 checks status of the PHD and determines when inbound packets are ready to be received. The forwarding processor 130 retrieves the highest priority header from PHD FIFOs and stores them in their cache 140. The forwarding processor 130 processes the header and sends required header elements simultaneously to both the RLE 100 and the PCE 110 where they are stored in egress queues. The RLE 100 performs a public or VPN unicast lookup and then a subsequent multicast lookup if required, while the PCE 110 runs filter checks against the header elements.

When completed the RLE 100 and PCE 110 pass status to the PHD 210 and store results in an egress queue which is polled by the forwarding processor 130. The operation of the RLE 100 will be described in detail below. The forwarding processor 130 polls and subsequently obtains the route lookup and classification results from which a new header is formulated. This new header is then written to the PHD 210 along with transmit information. The inbound SAR 150 retrieves the newly formatted header, returns it to packet memory 170 with the rest of the packet, and schedules the packet to be segmented and transmitted to the switch fabric.

The forwarding engine 20 processes outbound packets as follows. ATM cells are transferred from the switch packet to the outbound SAR 180 where the entire packet is reassembled and stored in packet memory 200. The outbound SAR 180 sends the header of the highest QoS packet to the PHD 210. The forwarding processor 130 checks the status of the PHD 210 and determines outbound packets are ready to be received. The forwarding processor 130 retrieves the highest priority header from the PHD FIFOs and stores them in their cache. The forwarding processor 130 processes the header and may send required header elements simultaneously to both the RLE 100 and the PCE 110 where they are stored in egress queues. The RLE 100 performs a public or VPN unicast lookup and then a subsequent multicast lookup if required, while the PCE 110 runs filter checks against the header elements.

When completed the RLE 100 and PCE 110 pass status to the PHD 210, store results in an egress queue which is polled by the forwarding processor 130. The forwarding processor 130 polls and subsequently obtains the route lookup and classification results from which a new header is formulated. This new header is then written to the PHD 210 along with transmit information. The outbound SAR 180 retrieves the newly formatted header, returns it to packet memory 200 with the rest of the packet, and schedules the packet to be transmitted to the physical frame interface.

Figure 3:
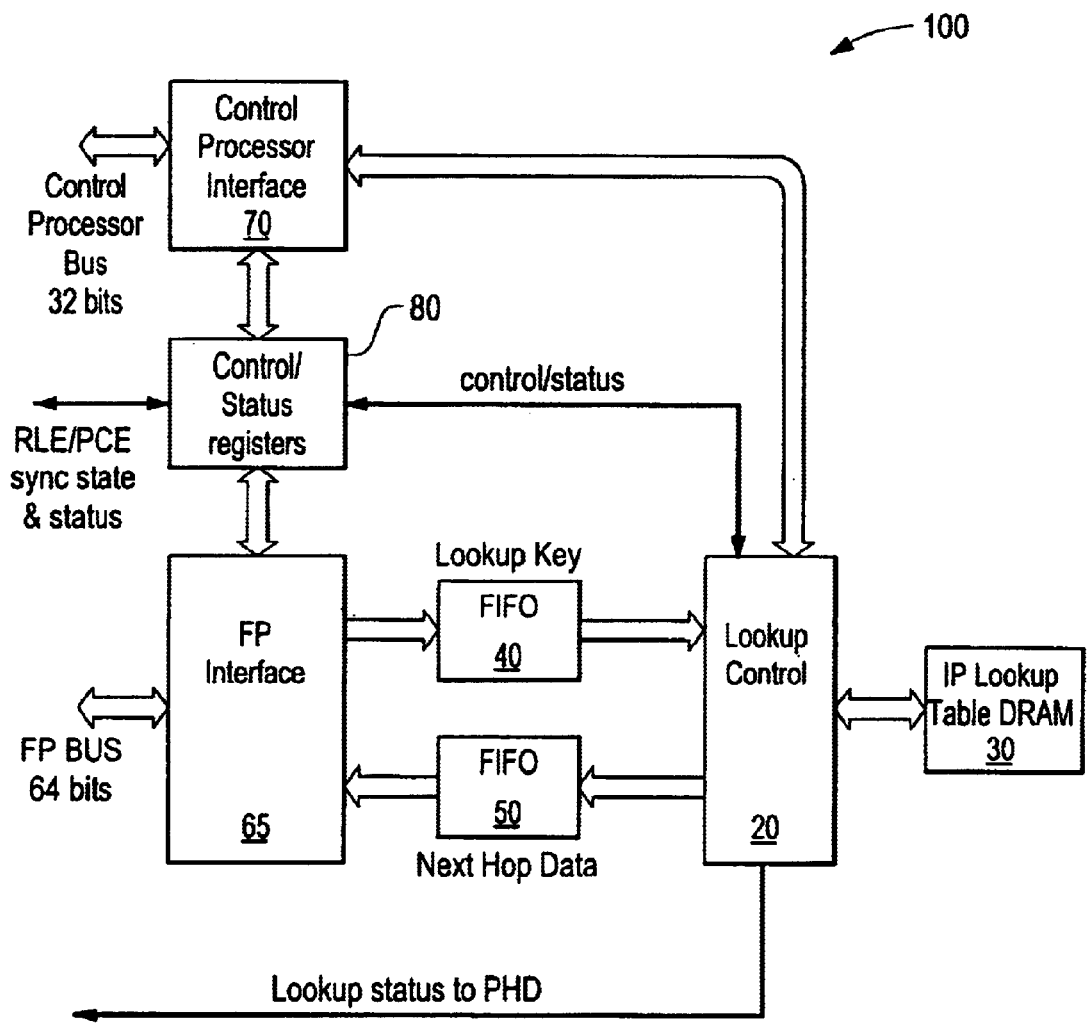
FIG. 3 is a block diagram of the RLE of the present invention.

Referring now to FIG. 3, a block diagram of the RLE 100 of the forwarding engine 20 is shown. The RLE is a hardware search engine for determining the next-hop index for the forwarding processor 130. The RLE comprises a forwarding processor (FP) interface 65, input and output FIFOs 40 and 50, a lookup controller 20, a lookup table DRAM 30, and a control processor interface 70. The FP interface 65 is used to load the key in the search engine. The key comprises the address of the root of the tree/the VPN ID unique to the physical port/logical port, the IP destination address, the IP source address, the order of the first level of the tree, and an optional request ID to be returned with the header for sequence error checking. The control processor interface 70 is used for performing table updates between lookups.

In operation the FP writes one or more cache lines to a common address for both the RLE and the PCE simultaneously. The FP interface 65 is used to retrieve the search results from both the RLE and PCE simultaneously. They report together from the same address, with a portion of the result provided by the PCE and a portion of the result provided by the RLE.

The RLE includes FIFO or other interfaces to enable it to maximize throughput. The input and output FIFOs allow several lookup requests from the FP to be outstanding at a given time. If those packets have different lookup times, the FIFOs smooth the lookup rate, by allowing several header bursts in and out of the RLE. The RLE performs both unicast and multicast IP address lookup on Virtual Private Networks (VPNs). Each VPN is used as a pointer to the root of a table specific to that VPN. Multiple VPNs may map to the same route table via software indirection.

To forward IP packets, the Power Processor Controller submits a route lookup request to the PHD. The hardware VST tables of the RLE are used to resolve the request with the resulting indices included with the response from the RLE. Once the indices are made available to the Power Processor Controller, they are used to directly access the forwarding information from the forwarding table.

The results from the route lookup comprise the next-hop index, valid lookup/no route found bits, status flags, a multicast lookup preformed bit, statistics information and an optional request ID for sequence error checking.

The RLE search is first performed on the IP destination address and subsequently on the IP source address if the packet is a multicast packet. The search utilizes a multi-bit tree search with prefix expansion and capture. The search terminates when a next-hop index is found or the end of the key is reached. Hardware error checking terminates the search and reports an error if an attempt is made to continue past 64 bits of IP header search at the end of the IP source address. An RLE manager of the routing subsystem manages the RLE memory. The RLE memory is used to store the hardware Variable Stride Trie (VST) route tables for each of the configured Virtual Private Networks (VPNs) including the default VPN, VPN0. Each hardware VST is guaranteed a minimum amount of contiguous memory space. The remaining memory space is made available as free pools of memory blocks. As routes are added to and deleted from the VST tables, memory blocks are allocated from and released to these memory pools. The routing subsystem manages the memory to keep fragmentation of the memory at a minimum.

The routing subsystem ensures that the forwarding database resident on the memory of the Power Processor Controller remains in synchronization with the hardware VST tables resident on the memory of the RLE. Similarly, the software VST tables resident on the memory of the Kernel processor must remain synchronized with the hardware VST tables of the RLE.

The RLE includes Variable Stride Trie (VST) based route lookup tables which reside on a local memory. These VST tables correspond to one specific route. Each entry of the hardware VST table contains an index to the corresponding forwarding entry within a forwarding table resident on the Power Processor Controller memory.

For each VPN, a single software VST is maintained in the memory of the kernel processor and a corresponding hardware VST is maintained in the RLE memory. VST route tables are built with a Variable Stride Trie data structure which supports best matching prefixes at a high rate. The VST tables are built by partitioning the search key into discrete bit strings. The search key is the IP address. The number of VST levels specifies the maximum number of memory accesses during the route lookup. Thus, the time to complete the lookup is bounded but not deterministic. The length of each VST level is known as the stride length and determines the number of elements within the node representing that partition.

The hardware VST data structures comprise:

Element

| 31 | 30 | 29 | 28 | 24 | 23 | 0 |
|---|---|---|---|---|---|---|
| type | indirect | multicast | Order | | Pointer | |

Type: 0=Leaf, 1=Node
Order: $\log_2$ for nodes, prefix length for leaves
Pointer: pointer to base address of next node (null if invalid or index to forwarding entry (0xFFFFFF if invalid)

Node

| |
|---|
| Element [bit string value = 0] |
| Element [bit string value = 1] |
| ... |
| Element [bit string value = $2^{node\ order} - 1$] |

The hardware route search data structure comprises nodes, each of which is an array of elements. The number of elements in a node depends on the node order, where order is the number of bits of the search key (destination IP address) used to evaluate this node. Each element has a type indicator that designates the NEXT node as either a leaf or the root of another node. The order indicates the order of the NEXT node if the type of the current node is "node" and the prefix length of the leaf if the type of the current node is "leaf". The pointer field depends on the element type. If the type is a "leaf", the pointer is an index into the foreground forwarding table and identifies the forwarding entry for the destination address/mask pair. If the type is "node", the pointer is a pointer into search space identifying the address of the next node to be evaluated. The table below lists the meaning of the order and pointer fields for different types.

| Type | Order | Pointer |
|---|---|---|
| 0 (Node) | $Log_2$ (# of elements in node at pointer) | Points to a node |
| 1 (Leaf) | (Prefix length-1_) of entry pointer | Index to forw. entry |

The RLE table entry comprises:

| Bits | 31 | 30 | 29 | 28 | 24 | 23 | 0 |
|---|---|---|---|---|---|---|---|
| Field | P (1) | T (1) | I (1) | Order (5) | | RLE-Root/Flag.NHP | | where:

| | |
|---|---|
| P: | Parity bit. Odd parity is optionally written into and read out of the SDRAM by the hardware. {1 bit} |
| T: | Type bit. 0 = node, 1 = leaf. {1 bit} |
| I: | Indirect bit. 1 = indirect, 0 = direct. {1 bit} |
| Order: | Order of next level corresponding to 1 to 32 {5 bits} |
| RLE_ROOT/Flag.NHP: | There are 2 contexts to this data field depending on the T bit. If a node, it is the Next Node Pointer {24 bits} or if a leaf, it is the RLE flags (8 bits) prepended to the RLE Next Hop Pointer {16 bits}. |

The RLE Root is used to start the search. The RLE root contains the root pointer and the order of the first level of the tree. The first lookup address is comprised of the root pointer plus an index. The index is derived from the upper bits of the destination address. The number of bits is variable and is indicated by the order of the first level. This address is used to lookup an element from the table. If this element is a leaf then the search is complete and the element is passed back to the PCE/RLE manager. If the element is a node, then the pointer is used for the next lookup.

The address for the next lookup is comprised of the above pointer plus an index. The index is derived from the "next" bits from the destination address. The exact bits are derived from the order of the last level, plus the order of this level. Therefore, the order of each level needs to be tracked in order to know the relevant bits of the Destination Address to be used for the index.

This address is again used to lookup an element for the table. If this element is a leaf, then the search is complete and the element is passed back to the PCE/RLE manager. If the element is a node, then the pointer is used for the next lookup. This is repeated until a leaf is found. If the number of accesses or levels exceeds a maximum number an error is returned instead.

In certain configurations it is desirable to have a method of indirection for the route lookup. This is accomplished by use of the indirect bit. When the indirect bit is set, the leaf flag is ignored, the order field is not used, and the current 24 bit pointer is used as a direct table index, with the route results returned from that indexed location. The indirect function can also be invoked by setting the depth to zero.

Figure 4:
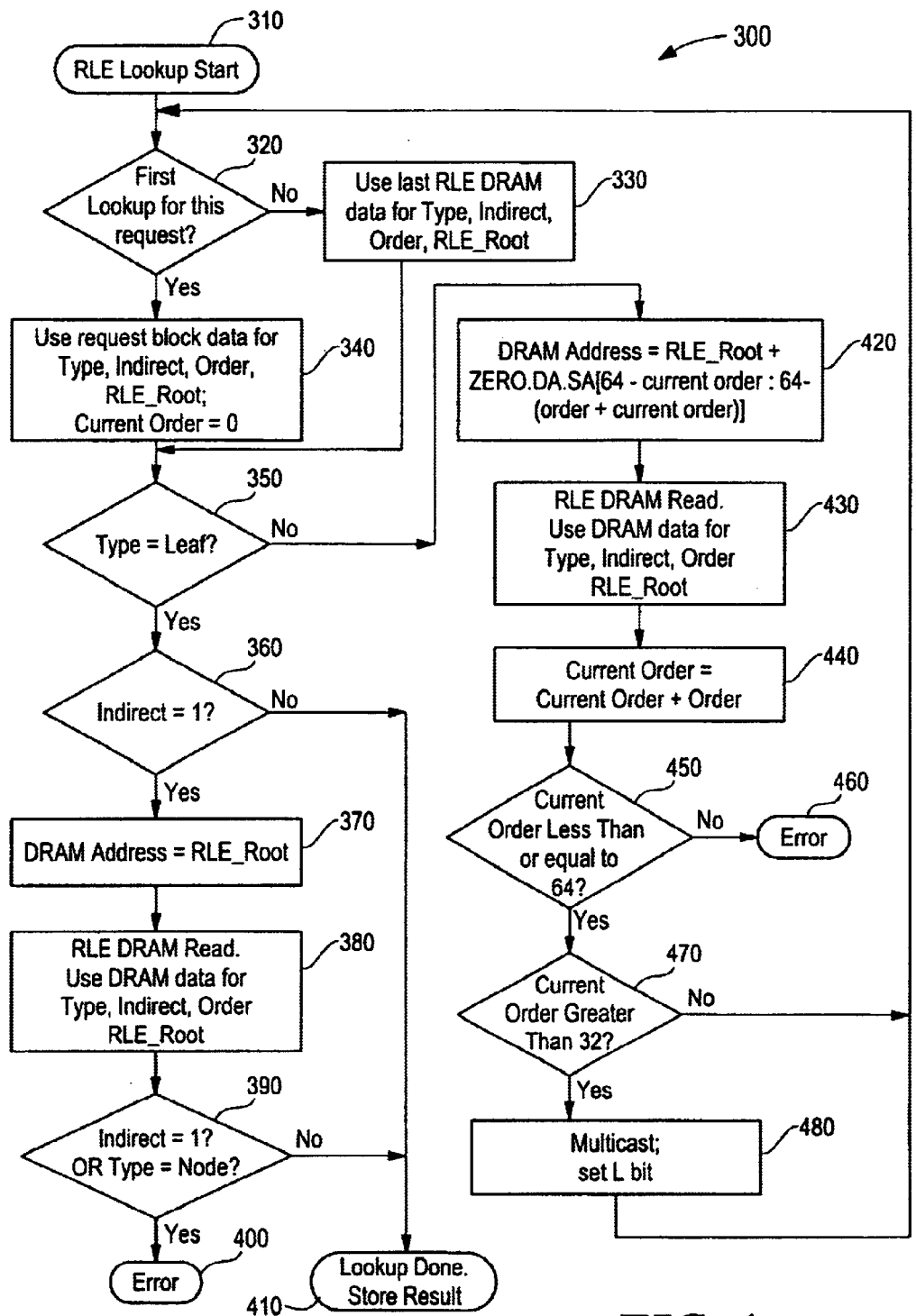
FIG. 4 is a flow chart for performing a route lookup according to the present invention.

Referring now to FIG. 4 a flowchart of the presently disclosed method 300 of performing a route lookup is shown. The lookup is started upon receipt of a request at step 310. At step 320 a determination is made as to whether this is the first lookup for this request. If this is not the first lookup for the request than the previous values for the TYPE, INDIRECT, ORDER and RLE ROOT are used, as shown in step 330. If this is the first lookup for this request, then the values for the TYPE, INDIRECT, ORDER and RLE ROOT are taken from the request block data.

At step 350 the TYPE bit is evaluated. IF the type is not a "leaf", then steps 420 through 480 et seq. are executed. At step 420 the dram address is set to the RLE ROOT plus zero concatenated with the destination address and the source address.

Step 430 is then executed which performs a read from the dram address and new values for the TYPE, INDIRECT, ORDER and RLE ROOT are obtained. At step 440 the current order is set to the current order plus the order.

At step 450 a determination is made as to whether the current order is less than or equal to sixty-four. If it is not, then an error condition is indicated and the search terminates. If the current order is less than or equal to sixty-four, then a determination is made at step 470 as to whether the current order is greater than thirty-two. If not, then another lookup is performed beginning at step 320. If the current order is greater than thirty-two, then step 480 is executed the L bit is set, indicating a multicast operation. After step 480, another lookup is performed beginning at step 320.

Referring back to step 350, if the TYPE bit was not a "leaf", then a determination is made at step 360 whether the INDIRECT bit is set. If the INDIRECT bit is not set, then the lookup is complete and the results stored, as shown in step 410.

When the indirect bit is set at step 360, step 370 is executed wherein the dram address is set to the RLE ROOT. At step 380 the address of the RLE dram is read and new values for the TYPE, INDIRECT, ORDER and RLE, ROOT are obtained. At step 390 if the INDIRECT bit is set or if the type is a "node" than an error condition is indicated and the lookup terminates as shown in step 400. When either the INDIRECT bit is not set or the TYPE bit does not indicate a node, the lookup is complete and the results stored, as shown in step 410.

Having described preferred embodiments of the present invention it should be apparent to those of ordinary skill in the art that other embodiments and variations of the presently disclosed embodiment incorporating these concepts may be implemented without departing from the inventive concepts herein disclosed. Accordingly, the invention should not be viewed as limited to the described embodiments but rather should be limited solely by the scope and spirit of the appended claims.

We claim:

1. A route lookup engine comprising:
an IP lookup table memory including at least one trie for at least one network;
a lookup controller in communication with said IP lookup table memory and capable of searching said IP lookup table memory to obtain a next hop index; and
a forwarding processor interface in electrical communication with said lookup controller, said forwarding processor interface providing a search key to said lookup controller for said lookup controller to begin searching said IP lookup table, said forwarding processor interface receiving said next hop index from said lookup controller.

2. The route lookup engine of claim 1 wherein the at least one network is a virtual private network.

3. The route lookup engine of claim 1 further comprising a processor interface in communication with said lookup controller and performing table updates to said IP lookup table memory.

4. The route lookup engine of claim 1 further comprising a lookup key memory disposed between said forwarding processor interface and said lookup controller.

5. The route lookup engine of claim 4 wherein the lookup key memory is a FIFO memory.

6. The route lookup engine of claim 1 further comprising a next hop result memory disposed between said lookup controller and said forwarding processor interface.

7. The route lookup engine of claim 6 wherein the next hop result memory is a FIFO memory.

8. The route lookup engine of claim 1 further comprising a control/status register in communication with said processor interface, said forwarding processor interface and said lookup controller.

9. The route lookup engine of claim 1 wherein said lookup controller performs a unicast lookup.

10. The route lookup engine of claim 1 wherein said lookup controller performs a multicast lookup.

11. The route lookup engine of claim 1 wherein said search key comprises an IP address.

12. The route lookup engine of claim 1 wherein said lookup memory comprises a Dram.

13. The route lookup engine of claim 1 wherein said at least one trie comprises a variable stride trie.

14. The route lookup engine of claim 1 wherein said lookup controller performs prefix expansion and capture when searching said IP lookup table memory.

15. A method for operating a route lookup engine comprising steps of:
receiving a route lookup request;
performing a route lookup comprising the steps of:
determining if the lookup is the first one for said request;
using current block data for said request when the lookup is the first lookup for said request, using prior block data when the lookup is not the first lookup for said request;
determining if said block data indicates a leaf, and when said block data does not indicate a leaf performing the steps of:
providing a route table lookup address comprising a route lookup engine root from said block data plus an address comprising a zero bit concatenated with a destination address concatenated with a source address minus the current order data from said block data;
performing a read from said lookup table, said read providing new block data;
setting the current order data to the present current order data plus the order data from the new block data;
returning to said step of determining if the lookup is the first one for said request;
performing the following steps when said block data does indicate a leaf:
determining if the indirect bit is set in said block data and when said indirect bit is set performing the steps of:
providing a route table lookup address comprising a route table lookup engine route from said block data;
performing a read from said lookup table, said read providing new block data;
storing results if said indirect bit does not equal a one and the type bit does not equal node; and
performing the step of storing results when said indirect bit is not set.

16. The method of claim 15 wherein the step of setting the current order data further comprises the step of indicating an error condition when said current order data is less than or equal to sixty-four.

17. The method of claim 15 wherein the step of setting the current order data further comprises the step of setting a multicast bit when said current order is greater than thirty-two.

18. The method of claim 15 wherein the step of storing results if said indirect bit does not equal a one and the type bit does not equal node further comprises the step of indicating an error condition if said indirect bit equals a one or said type bit equals a node.

19. The method of claim 15 wherein said step of performing a route lookup comprises performing a unicast lookup.

20. The method of claim 15 wherein said step of performing a route lookup comprises performing a multicast lookup.

21. A method for operating a route lookup engine comprising the steps of:
receiving a route lookup request;
performing a route lookup comprising the steps of:
determining if the lookup is the first one for said request;
using current block data for said request when the lookup is the first lookup for said request, using prior block data when the lookup is not the first lookup for said request;
determining if said block data indicates a leaf, and when said block data does indicate a leaf performing the steps of:
determining if an indirect bit is set in said block data and when said indirect bit is set performing the steps of:
providing a route table lookup address comprising a route table lookup engine route from said block data;

performing a read from said lookup table, said read providing new block data;

storing results if said indirect bit does not equal a one and the type bit does not equal node; and performing the step of storing results when said indirect bit is not set.

* * * * *